US012397857B2

(12) United States Patent
Gali et al.

(10) Patent No.: US 12,397,857 B2
(45) Date of Patent: Aug. 26, 2025

(54) VEHICLE AND TRAILER MANEUVER ASSIST SYSTEM

(71) Applicant: MAGNA ELECTRONICS INC., Auburn Hills, MI (US)

(72) Inventors: Jyothi P. Gali, Rochester Hills, MI (US); Richard C. Bozich, Canton, MI (US); Nikhil Gupta, Brampton (CA); Daniel W. Hodgman, Royal Oak, MI (US); Timothy M. Phillips, Fenton, MI (US); Clarence P. McElroy, Grand Blanc, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 18/679,740

(22) Filed: May 31, 2024

(65) Prior Publication Data
US 2024/0319726 A1   Sep. 26, 2024

Related U.S. Application Data

(63) Continuation of application No. 17/305,954, filed on Jul. 19, 2021, now Pat. No. 12,001,213, which is a
(Continued)

(51) Int. Cl.
*B62D 13/06* (2006.01)
*B60R 1/00* (2022.01)
(Continued)

(52) U.S. Cl.
CPC ............... *B62D 13/06* (2013.01); *B60R 1/00* (2013.01); *B60R 1/26* (2022.01); *B60W 10/18* (2013.01);
(Continued)

(58) Field of Classification Search
CPC .. B62D 13/06; B62D 15/025; B62D 15/0285; B60R 1/00; B60R 1/26; B60R 2300/105;
(Continued)

(56) References Cited

U.S. PATENT DOCUMENTS 5,550,677 A    8/1996   Schofield et al.
5,670,935 A    9/1997   Schofield et al.
(Continued)

FOREIGN PATENT DOCUMENTS

DE    102016105261 A1    9/2016

*Primary Examiner* — Isaac G Smith
(74) *Attorney, Agent, or Firm* — HONIGMAN LLP

(57) ABSTRACT

A vehicular trailering assist system includes at least one vehicle camera, an electronic control unit (ECU) and a display screen disposed at a vehicle. When a trailer hitched to the vehicle is not a trailer for which the vehicular trailering assist system has been previously calibrated, the driver is instructed to calibrate the system for the trailer. When the vehicular trailering assist system is calibrated, the system determines an obstacle-free path of travel for the vehicle and the trailer to follow to maneuver toward a target location. The system controls steering of the vehicle to maneuver the vehicle and the trailer along the determined obstacle-free path of travel. While the vehicle and the trailer are maneuvered along the determined obstacle-free path of travel, the determined obstacle-free path of travel is displayed on the display screen overlaying displayed video images derived from image data captured by the vehicle camera.

57 Claims, 14 Drawing Sheets

Drag or touch for new destination

Related U.S. Application Data continuation of application No. 16/110,575, filed on Aug. 23, 2018, now Pat. No. 11,067,993.

(60) Provisional application No. 62/667,729, filed on May 7, 2018, provisional application No. 62/569,658, filed on Oct. 9, 2017, provisional application No. 62/549,989, filed on Aug. 25, 2017.

(51) Int. Cl.
| | |
|---|---|
| *B60R 1/26* | (2022.01) |
| *B60W 10/18* | (2012.01) |
| *B60W 10/20* | (2006.01) |
| *B60W 30/18* | (2012.01) |
| *B62D 15/02* | (2006.01) |
| *G01C 21/36* | (2006.01) |
| *G05D 1/00* | (2006.01) |
| *G05D 1/249* | (2024.01) |
| *G05D 1/617* | (2024.01) |

(52) U.S. Cl.
CPC ...... *B60W 10/20* (2013.01); *B60W 30/18036* (2013.01); *B62D 15/025* (2013.01); *B62D 15/0285* (2013.01); *G01C 21/3623* (2013.01); *G01C 21/3664* (2013.01); *G05D 1/0214* (2013.01); *G05D 1/0231* (2013.01); *G05D 1/249* (2024.01); *G05D 1/617* (2024.01); *B60R 2300/105* (2013.01); *B60R 2300/20* (2013.01); *B60R 2300/808* (2013.01); *B60W 2554/00* (2020.02)

(58) Field of Classification Search
CPC ......... B60R 2300/20; B60R 2300/808; B60W 10/18; B60W 10/20; B60W 30/18036; B60W 2554/00; G01C 21/3623; G01C 21/3664; G05D 1/0214; G05D 1/0231; G05D 1/249; G05D 1/617
USPC ........................................................ 701/446
See application file for complete search history.

(56) References Cited

U.S. PATENT DOCUMENTS

| | | |
|---|---|---|
| 5,949,331 A | 9/1999 | Schofield et al. |
| 6,690,268 B2 | 2/2004 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 8,874,317 B2 | 10/2014 | Marczok et al. |
| 9,085,261 B2 | 7/2015 | Lu et al. |
| 9,937,953 B2 | 4/2018 | Lavoie et al. |
| 11,067,993 B2 | 7/2021 | Gali et al. |
| 12,001,213 B2 | 6/2024 | Gali et al. |
| 2007/0196095 A1* | 8/2007 | Perala ................ G03B 15/03 396/155 |
| 2009/0319100 A1 | 12/2009 | Kale et al. |
| 2014/0085472 A1 | 3/2014 | Lu et al. |
| 2014/0160276 A1 | 6/2014 | Pliefke et al. |
| 2014/0358424 A1* | 12/2014 | Lavoie ................ B62D 13/06 701/428 |
| 2015/0002670 A1 | 1/2015 | Bajpai |
| 2015/0158527 A1 | 6/2015 | Hafner et al. |
| 2015/0217693 A1 | 8/2015 | Pliefke et al. |
| 2015/0344028 A1 | 12/2015 | Gieseke et al. |
| 2016/0039456 A1* | 2/2016 | Lavoie ................ B62D 15/027 701/41 |
| 2017/0015312 A1 | 1/2017 | Latotzki |
| 2017/0017847 A1 | 1/2017 | Nakaya |
| 2017/0017848 A1 | 1/2017 | Gupta et al. |
| 2017/0050672 A1 | 2/2017 | Gieseke et al. |
| 2017/0217372 A1 | 8/2017 | Lu et al. |
| 2017/0253237 A1 | 9/2017 | Diessner |
| 2017/0254873 A1 | 9/2017 | Koravadi |
| 2017/0317748 A1 | 11/2017 | Krapf |
| 2017/0329346 A1 | 11/2017 | Latotzki |
| 2018/0141658 A1 | 5/2018 | Baur |
| 2018/0211528 A1 | 7/2018 | Seifert |
| 2018/0215382 A1 | 8/2018 | Gupta et al. |
| 2018/0253608 A1 | 9/2018 | Diessner et al. |
| 2018/0276838 A1 | 9/2018 | Gupta et al. |
| 2018/0276839 A1 | 9/2018 | Diessner et al. |
| 2019/0016264 A1 | 1/2019 | Potnis et al. |
| 2019/0066503 A1* | 2/2019 | Li .................. G01C 21/3685 |
| 2019/0118860 A1 | 4/2019 | Gali et al. |
| 2019/0220034 A1* | 7/2019 | Balogh ................ G05D 1/0246 |
| 2019/0297233 A1 | 9/2019 | Gali et al. |
| 2020/0017143 A1 | 1/2020 | Gali |
| 2020/0406889 A1* | 12/2020 | Yamanaka ........... G06V 20/586 |

* cited by examiner

Drag or touch for new destination

Rotate Knob to select new destination

US 12,397,857 B2

VEHICLE AND TRAILER MANEUVER ASSIST SYSTEM

CROSS REFERENCE TO RELATED APPLICATIONS

The present application is a continuation of U.S. patent application Ser. No. 17/305,954, filed Jul. 19, 2021, now U.S. Pat. No. 12,001,213, which is a continuation of U.S. patent application Ser. No. 16/110,575, filed Aug. 23, 2018, now U.S. Pat. No. 11,067,993, which claims the filing benefits of U.S. provisional application Ser. No. 62/667,729, filed May 7, 2018, U.S. provisional application Ser. No. 62/569,658, filed Oct. 9, 2017, and U.S. provisional application Ser. No. 62/549,989, filed Aug. 25, 2017, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. It is also known to use cameras to assist in hitching a vehicle to a trailer and/or in determining a trailer angle of a trailer relative to a vehicle. Examples of such known systems are described in U.S. Pat. Nos. 9,085,261 and/or 6,690,268, which are hereby incorporated herein by reference in their entireties.

SUMMARY OF THE INVENTION

The present invention provides a trailer maneuver assist system for a vehicle that utilizes one or more cameras (preferably one or more CMOS cameras) to capture image data representative of images exterior and rearward of the vehicle and trailer towed by the vehicle, and controls the vehicle to reverse the vehicle and trailer along a determined path of travel and toward a target location. The system displays bird's-eye view or surround view images of the vehicle and trailer and area rearward of the trailer and the user selects a target location. The system determines an appropriate (obstacle free) path for the vehicle and trailer to follow to maneuver the trailer toward the selected target location. The system provides control algorithms to assist maneuvering the vehicle and trailer without the need for manual steering, acceleration or brake input by the driver.

These and other objects, advantages, purposes and features of the present invention will become apparent upon review of the following specification in conjunction with the drawings.

DESCRIPTION OF THE PREFERRED EMBODIMENTS

A vehicle and trailer maneuvering system or maneuver assist system and/or driving assist system operates to capture images exterior of the vehicle and trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The vision system includes an image processor or image processing system that is operable to receive image data from one or more cameras and may provide an output to a display device for displaying images representative of the captured image data. Optionally, the vision system may provide display, such as a rearview display or a top down or bird's eye or surround view display or the like.

Figure 1:
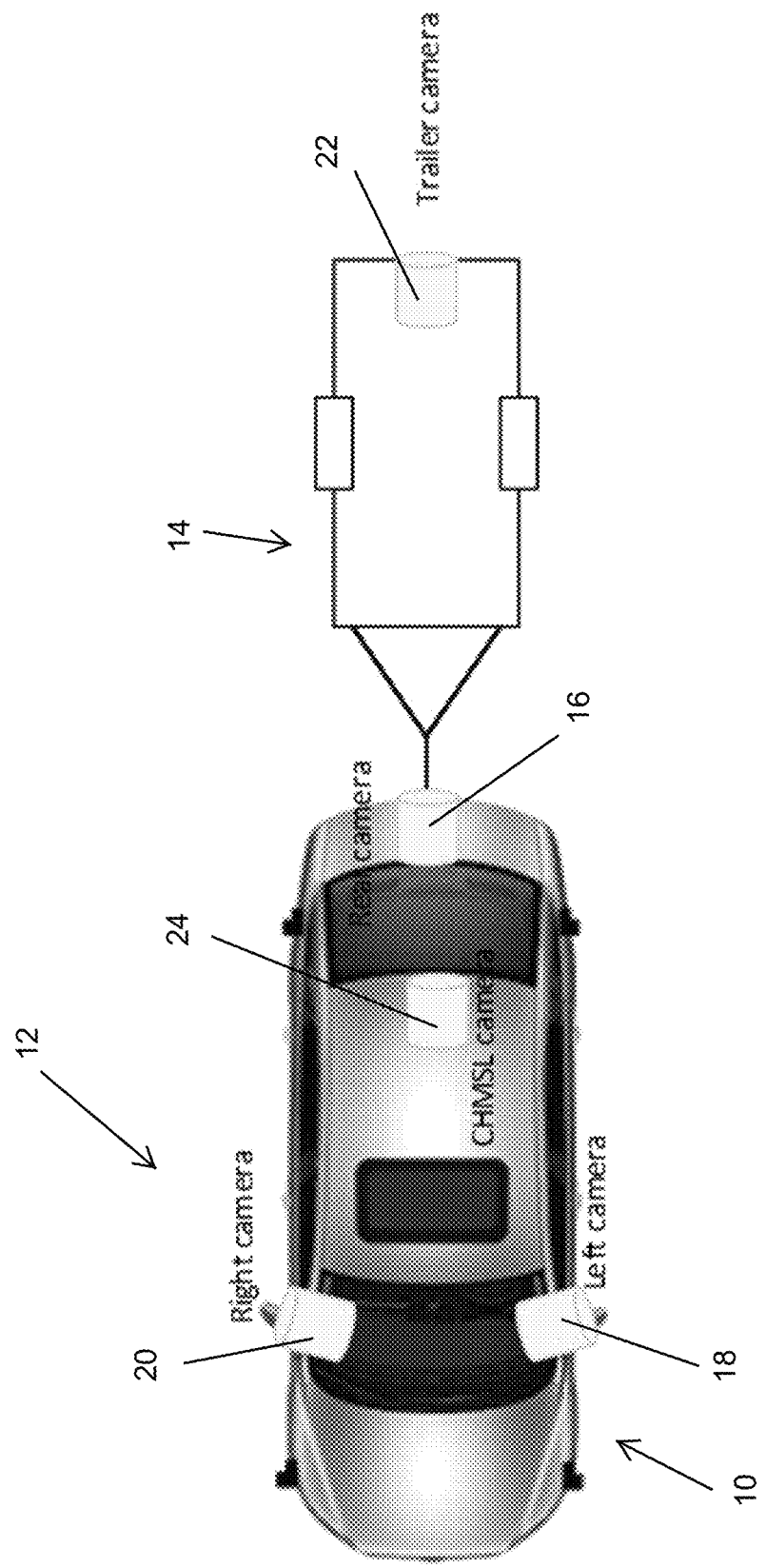
FIG. 1 is a plan view of a vehicle with a trailer maneuver assist system that is operable to control or guide the vehicle and to reverse the vehicle and trailer toward and into a selected location in accordance with the present invention.

Referring now to the drawings and the illustrative embodiments depicted therein, a vehicle 10 includes a trailer maneuver assist system 12 that is operable to maneuver the vehicle 10 and trailer 14 toward a desired or selected location. The trailer maneuver assist system 12 includes at least one exterior viewing vehicle-based imaging sensor or camera, such as a rearward viewing imaging sensor or camera 16 (and the system may optionally include multiple exterior viewing imaging sensors or cameras, such as a sideward/rearward viewing camera 18, 20 at respective sides of the vehicle), and a rearward viewing trailer-based camera 22, which capture image data representative of the scene exterior of the vehicle and trailer, with the cameras each having a lens for focusing images at or onto an imaging array or imaging plane or imager of the cameras (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The trailer maneuver assist system 12 includes a control or electronic control unit (ECU) or processor that is operable to process image data captured by the camera or cameras and may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the camera to the ECU may comprise any suitable data or communication link, such as a vehicle network bus or the like of the equipped vehicle.

The system of the present invention is operable to automatically maneuver a trailer which is connected to a vehicle to a user's desired or selected location. The system receives an input from a touch screen of the vehicle (such as at a center stack display) for the destination location and converts the pixel (X, Y) coordinates from the touch input to real world coordinates (XYZ). The system plans the path of the vehicle and trailer towards the desired location. The system may support autonomous driving of the vehicle, and may automatically control the vehicle steering angle to direct the trailer toward the desired or selected location.

After initial selection of the target area displayed on the screen via the user input, reversing of the vehicle and the trailer to the target location (represented by the selected target area) is at least semi-autonomous in that at least steering, and preferably at least steering and the reversing speed of the vehicle, and more preferably at least steering, reversing speed and braking of the vehicle, is under automatic control by the control system. Further, image and/or sensor data captured by the vehicle and trailer sensors, during such semi-autonomous reversing maneuvering of the vehicle and trailer, is processed at a data processor using machine vision techniques, such as known machine vision techniques. And should such data processing detect an object either in the determined or projected path of travel or likely to enter the determined or projected path of travel (such as another vehicle or pedestrian or bicyclist or the like present in or approaching the determined or projected path of travel of the vehicle and trailer), the system reacts to mitigate any potential collision or hazard in such situations. For example, based on such a detected potential collision or hazard, an alert may be generated to a driver or occupant of the vehicle alerting that discontinuing the current reversing maneuver would be recommended. Optionally, for example, based on such a detected potential collision or hazard, the system may stop the maneuver itself and await further instructions/input from user. Optionally, for example, based on such a detected potential collision or hazard, the system may adjust the rearward path of travel to mitigate or avoid impact with or hazard by the detected object.

The system does not require user measurements and/or a target sticker attached to a trailer. The system may work with any type of conventional trailer such as vehicle haulers, box trailers, utility trailers, loaded or unloaded boat trailers, snow mobile trailers, and any other custom trailers. The system functions independent of lighting conditions (such as, for example, day/night/sun/cloud/rain/snow) and road surfaces (such as, for example, concrete/asphalt/gravel/grass/dirt). The system may require an initial calibration where the vehicle is driving forward for less than five meters. However, no vehicle motion is preferred (no calibration).

As shown in FIG. 1, the trailer maneuver assist (TMA) system includes a camera 22 at the rear end of a trailer (trailer camera), and a multi-camera system on the towing vehicle. The multi-camera system includes a rearward viewing camera 16 (such as a rear backup camera), a left camera 18 (such as a side camera disposed at a left side rearview mirror assembly of the vehicle), a right camera 20 (such as a side camera disposed at a left side rearview mirror assembly of the vehicle), and a center high mounted stop lamp (CHMSL) camera 24. The TMA system is operable to perform without degradation, if at least the trailer camera and rear view camera on the towing vehicle are present.

Figure 2:
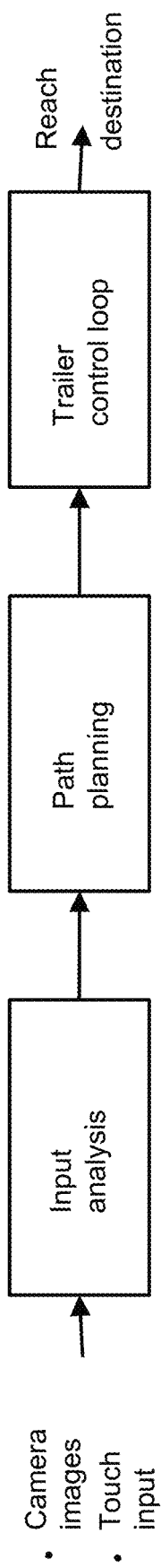
FIG. 2 is a block diagram of the functions of the trailer maneuver assist system of the present invention.
Figure 3:
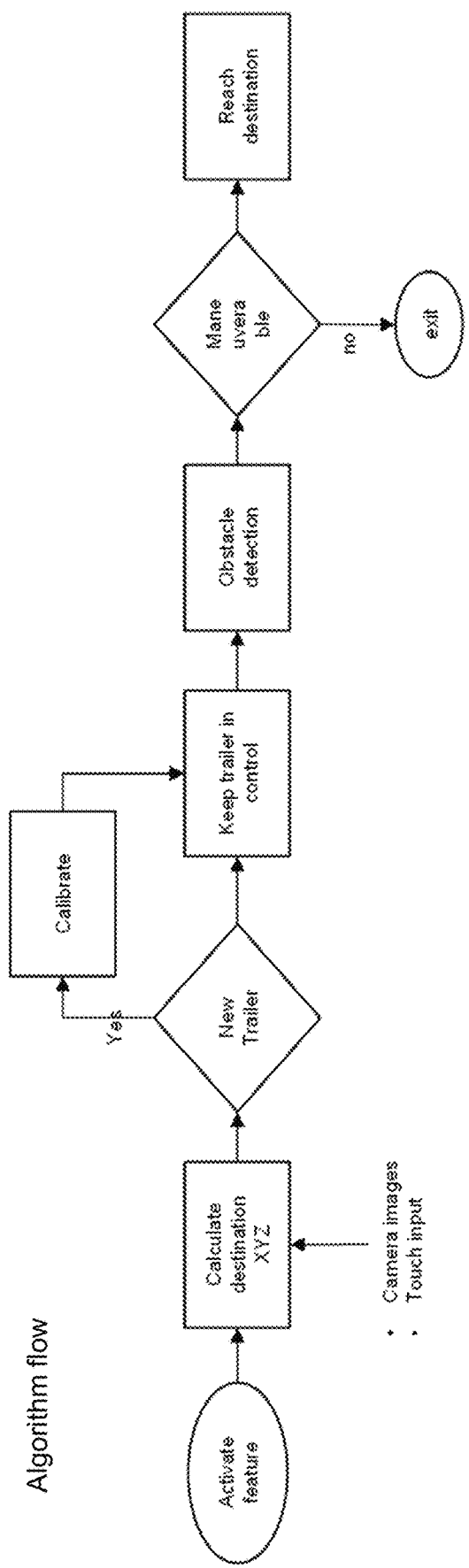
FIG. 3 is a block diagram of the algorithm flow of the trailer maneuver assist system of the present invention.

The algorithm for the TMA system is divided into three sections or blocks, as shown in FIG. 2. The system receives image data captured by the cameras, and receives a touch input indicative of the target location for the trailer, and performs an input analysis. Responsive to the input analysis, the system plans the target path toward the target location. The system includes a trailer control loop to control the vehicle to maneuver the vehicle and trailer toward the target location. The algorithm flow is shown in FIG. 3.

When the trailer maneuver assist (TMA) system is activated at a towing vehicle, the system checks if a trailer is connected to the towing vehicle, and the system checks if the connected trailer is already been calibrated or prompts a list of previously calibrated trailer to the user, such as at either an instrument cluster or center stack display of the towing vehicle, which allows the user to select a trailer from the list. If the trailer is new (not previously calibrated), the system may perform a one-time calibration for the trailer necessary to align/calibrate the system for that trailer.

Figure 5:
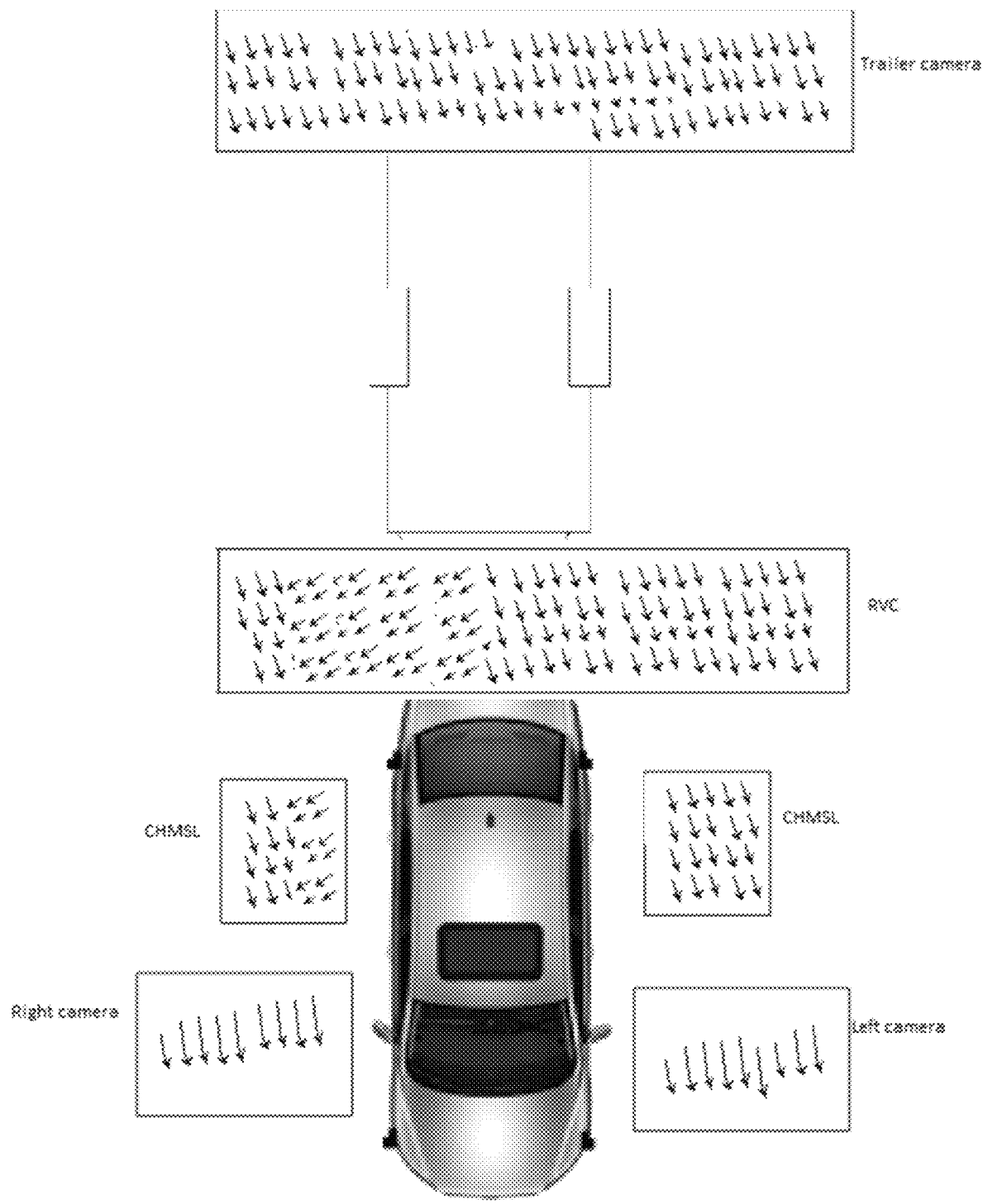
FIG. 5 is a plan view of the vehicle and trailer showing pixel motion vectors for the trailer camera and the vehicle multi-camera system.

If the trailer is not calibrated, the system prompts a message, either at the vehicle instrument cluster or center stack display, to the user to calibrate the trailer with instructions displayed at either the instrument cluster or center stack display to calibrate the trailer. The calibration instructions include "drive forward with/without turn". During the calibration phase, the TMA system finds the relation between the camera installed on the trailer and the towing vehicle, and measures pixel motion vectors (PMVs) of the trailer camera (T_PMV), and measures the PMVs for each camera in the multi-camera system of the towing vehicle (VChmsl_PMV, VLeft_PMV, VRight_PMV, VRear_PMV), such as shown in FIG. 5. The TMA system derives correlation matrices (CM[ ]) of the trailer camera with each and every camera of the towing vehicle's multi-camera system. Only a one time calibration sequence is required for each new trailer. Once the calibration sequence is completed, the TMA system provides confirmation to the user on either the instrument cluster or center stack display of the towing vehicle. The TMA system stores the calibration values of the trailer into non-volatile memory of the hardware on which the TMA algorithm and software is running. The PMVs include information about pixel speed (m/sec) in an orientation, and the maximum correlation matrix for the PMVs (MAX_CM_PMV) includes information pertaining to the maximum allowed pixel speed at the maximum allowed relative orientation of two cameras.

If the connected trailer has already been calibrated, or after the trailer has been calibrated, the system will display the bird's eye view of "towing vehicle+trailer" in a scene map on the display screen (such as a display screen at a center stack) of the vehicle. The bird's eye view or surround view is a top view projected image (comprising images derived from image data captured by the cameras of the vehicle and trailer) that shows 360 degree surroundings of towing vehicle and the trailer attached to it. The scene map (FIG. 4) is the region behind the towing vehicle which covers 'x' meters along a longitudinal axis from the center of the rear view camera and 'x/2' meters at each side of lateral axis from the center of the rear view camera. The dimension 'x' is preferably greater than 2×the length of the trailer, and the dimension 'x' depends on image resolution, field of view and height of the of the trailer camera. The scene map is generated using the trailer camera and the multi camera system on the towing vehicle. The TMA system prompts a message to the user (such as at the center stack display) to select a location in the scene map to which the trailer has to maneuver. The user may select a target location or point (X, Y) on the center stack display either by touching the screen (if the screen is touch enabled) or by using cursor buttons to move a cursor to the target location or point on the scene map.

Figure 4:
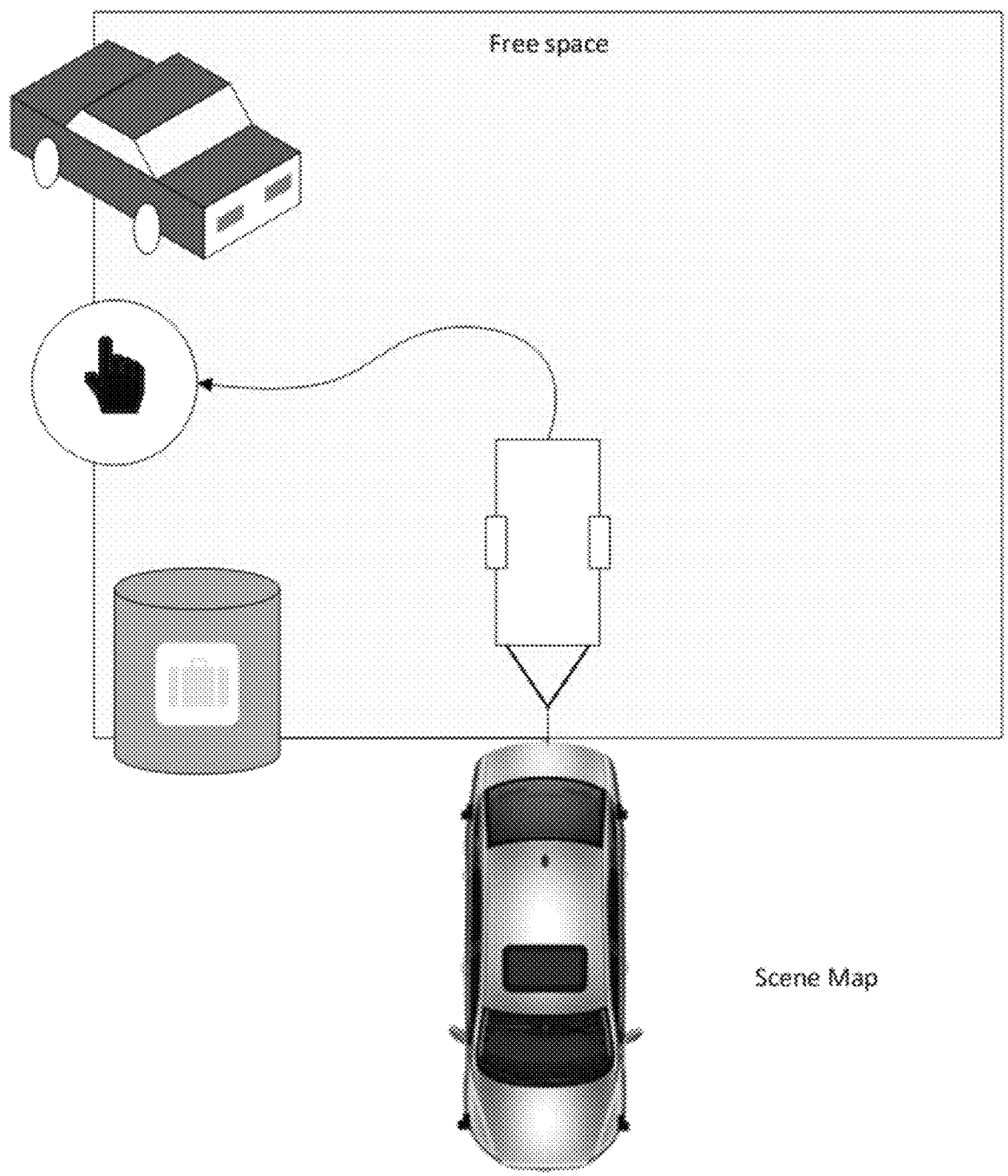
FIG. 4 is a view of the scene map and top view of the vehicle and trailer as displayed by a display screen to allow the user to select the targeted location.

When the user selects a location on the scene map to which the towing vehicle is to be maneuvered, the selected location in the screen coordinate system is then transformed into real world location (XYZ) using calibration parameters of the camera(s). The TMA system detects available free space available in the scene map in which the towing vehicle and trailer can be maneuvered, where the free space is free of obstacles. The TMA system identifies the path to maneuver towards the desired location. As shown in FIG. 4, the vehicle and trailer in the scene map is shown in the displayed bird's eye view to the user. The TMA system initiates the maneuver towards the desired location once the user agrees with the path planned by TMA system. The TMA system stops maneuvering the vehicle and provides a message to the user whenever an obstacle enters into the planned path.

When the user selects a location on the scene map, the TMA system automatically calculates the distance between the rear end of the trailer and the user's desired location (D_TrP), the path towards the user's desired location, and the desired correlation matrix (DCM[ ]) between the trailer camera and the vehicle multi-camera system for every $1/500^{th}$ distance of D_TrP using pixel motion vectors (PMVs) of the trailer camera and the vehicle multi cameras. When the maneuver is initiated, the TMA system continuously calculates the current correlation matrix (CCM) at a frequency of, for example, 60 samples per second. If the CCM at a given point of time x is not matching with DCM[x] during the maneuver, then the trailer position will be adjusted by controlling the steering of the towing vehicle until the CCM matches with DCM values and the DCM will be updated as per the new position of the trailer. This step continues to happen until the vehicle reaches the desired location. The TMA system considers the direction of maneuver to align the pixel motion vector in the trailer camera with that of the multi-camera system of the towing vehicle. The system shall not cross the maximum allowed pixel speed at the maximum allowed relative orientation of two cameras (MAX_CM_PMV) at any given point of time.

Figure 6:
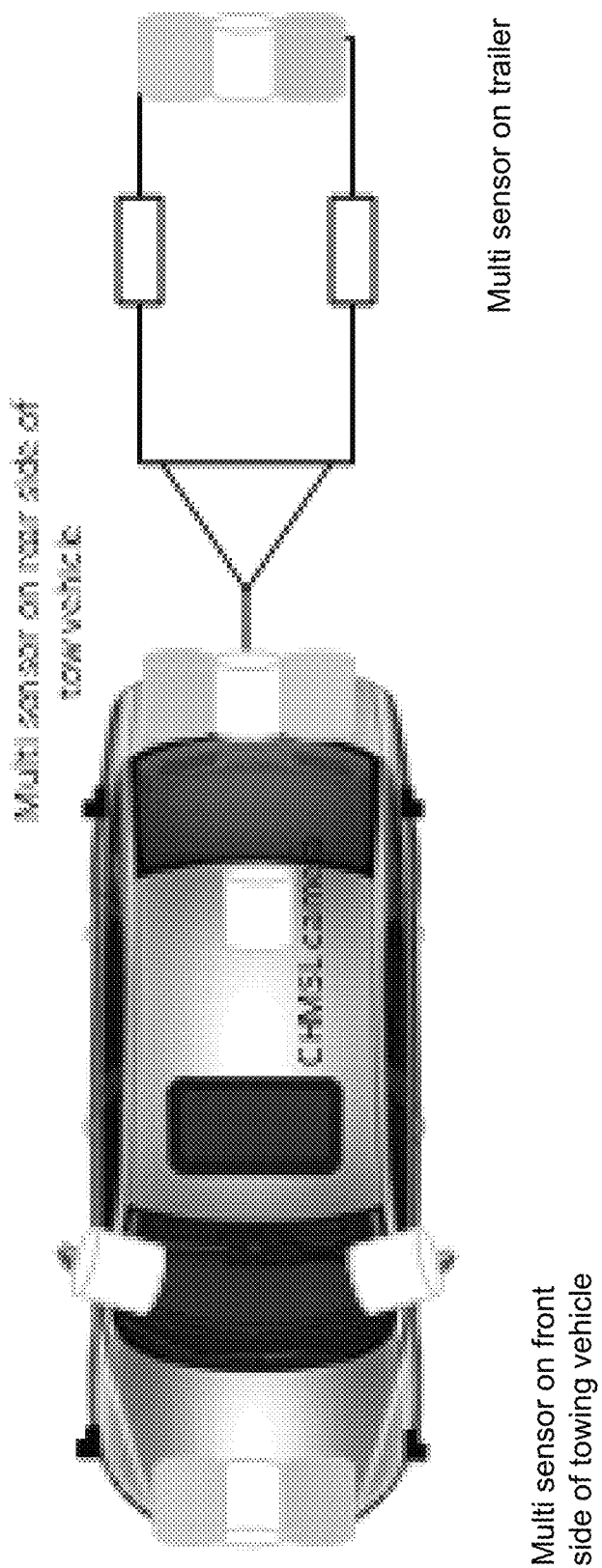
FIG. 6 is a plan view of a vehicle with another trailer maneuver assist system that is operable to control or guide the vehicle and to reverse the vehicle and trailer toward and into a selected location in accordance with the present invention.
Figure 6A:
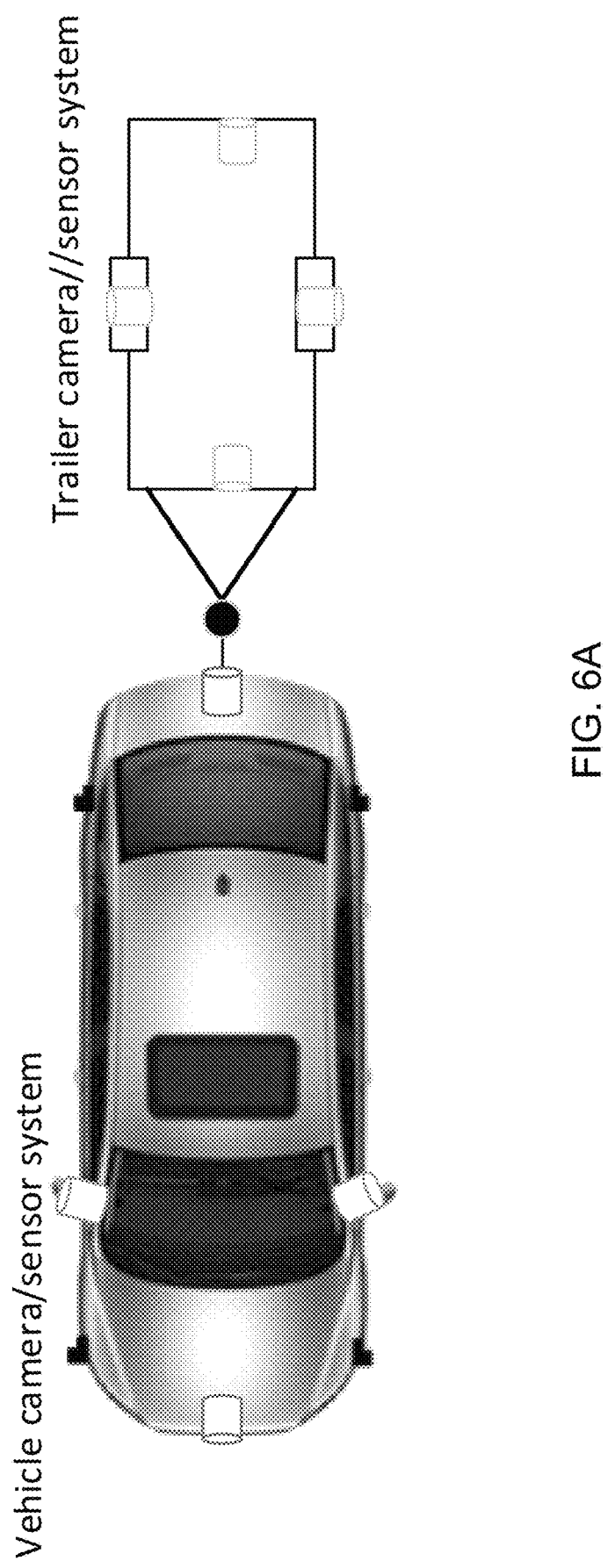
FIG. 6A is another plan view of a vehicle with another trailer maneuver assist system that is operable to control or guide the vehicle and to reverse the vehicle and trailer toward and into a selected location in accordance with the present invention.

Optionally, an advanced trailer assist (ATA) system may be similar to the TMA system described above, but may use various sensors at the vehicle and trailer. For example, and such as shown in FIGS. 6 and 6A, the advanced trailer assist (ATA) system includes a plurality of sensors 122 around or at the rear end of a trailer (trailer sensors), and a multi-sensor sensing system on the towing vehicle. The multi-sensor sensing system may include a plurality of rearward sensing sensors 116, a plurality of forward sensing sensors 117, a left sensor 118, a right sensor 120, and a center high mounted stop lamp (CHMSL) sensor 124 (the side sensors and CHMSL sensor may comprise cameras and the forward and rearward sensors and the trailer sensors may comprise radar sensors, lidar sensors and/or ultrasonic sensors and/or the like). The multiple sensors at the trailer (and similarly at the rear of the tow vehicle and at the front/sides of the tow vehicle) may comprise a camera or image-based sensor and a non-imaging sensor, such as a radar sensor, lidar sensor, an ultrasonic sensor and/or the like, such as shown in FIG. 6.

Figure 7:
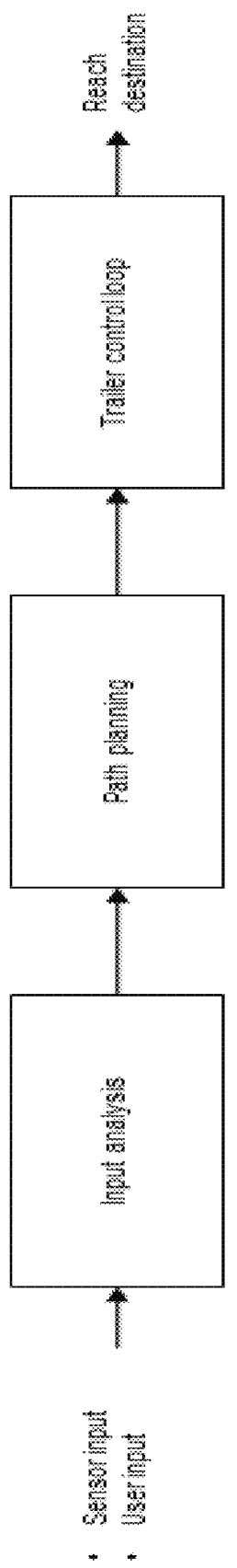
FIG. 7 is a block diagram of the functions of another trailer maneuver assist system of the present invention.
Figure 8:
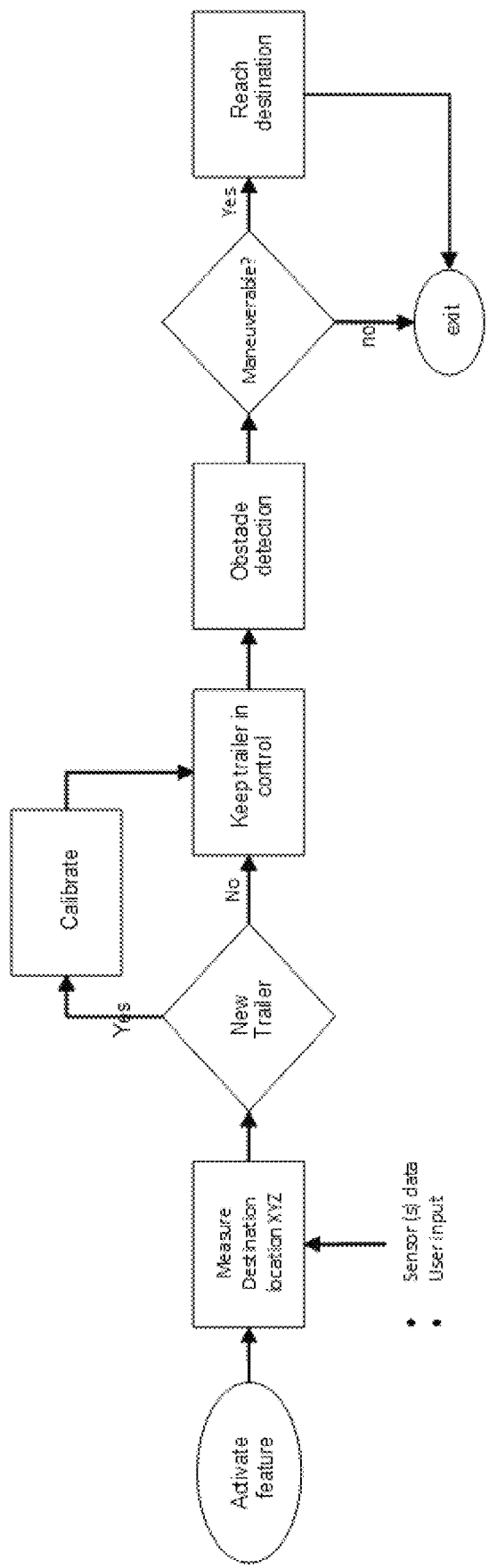
FIG. 8 is a block diagram of the algorithm flow of the trailer maneuver assist system of the present invention.

The algorithm for the ATA system is divided into three sections or blocks, as shown in FIG. 7. The system receives data sensed by the sensors, and receives a user input indicative of the target location for the trailer, and performs an input analysis. Responsive to the input analysis, the system plans the target path toward the target location. The system includes a trailer control loop to control the vehicle to maneuver the vehicle and trailer toward the target location. The algorithm flow is shown in FIG. 8.

When the ATA system is activated at a towing vehicle, the system checks if a trailer is connected to the towing vehicle, and the system checks if the connected trailer is already been calibrated or, if it is a calibrated trailer, the system prompts a list of previously calibrated trailer to the user, such as at either an instrument cluster or center stack display of the towing vehicle, which allows the user to select a trailer from the list. If the trailer is new (not previously calibrated), the system may perform a one-time calibration for the trailer necessary to align/calibrate the system for that trailer.

If the trailer is not calibrated, the system prompts a message, either at the vehicle instrument cluster or center stack display, to the user to calibrate the trailer with instructions displayed at either the instrument cluster or center stack display to calibrate the trailer. The calibration instructions include "drive forward with/without turn". During the calibration phase, the TMA system finds the relation between the sensors installed on the trailer and the towing vehicle, and measures motion vectors (MVs) of the trailer sensors (T_MV), and measures the MV for each sensor in the multi-sensor system of the towing vehicle (VChmsl_MV, VLeft_MV, VRight_MV, VRear_MV). The ATA system derives correlation matrices (CM[ ]) of the trailer sensors with each and every sensor of the towing vehicle's multi-sensor system. Only a one time calibration sequence is required for each new trailer. And minimal effort is needed to calibrate the trailer with the towing vehicle.

Once the calibration sequence is completed, the ATA system provides confirmation to the user on either the instrument cluster or center stack display of the towing vehicle. The ATA system stores the calibration values of the trailer into non-volatile memory of the hardware on which the ATA algorithm and software is running. The MVs include information about relative data change information, and the maximum correlation matrix for the MVs (MAX_CM_MV) includes information pertaining to the maximum allowed relative data change at the maximum allowed relative orientation between two sensors of same type.

If the connected trailer has already been calibrated, or after the trailer has been calibrated, the system will present one display the bird's eye view of "towing vehicle+trailer" in a relative scene map on the display screen (such as a display screen at a center stack) of the vehicle. The relative scene map is the region behind the towing vehicle which covers 'x' meters along a longitudinal axis from the center of the rear sensor and 'x/2' meters at each side of lateral axis from the center of the rear sensor. The dimension 'x' is preferably greater than 2× the length of the trailer, and the dimension 'x' depends on image resolution, field of view and height of the of the trailer sensors. The relative scene map is generated using the trailer sensors and the multi sensor system on the towing vehicle. The ATA system prompts a message to the user (such as at the center stack display) to select a location in the relative scene map to which the trailer has to maneuver. The user may select a target location or point (X, Y) on the center stack display either by touching the screen (if the screen is touch enabled) or by using cursor buttons to move a cursor to the target location or point on the scene map or by otherwise providing an input indicative of the target location.

When the user selects a location on the scene map to which the towing vehicle is to be maneuvered, the selected location in the screen coordinate system is then transformed into real world location (XYZ) using calibration parameters of the sensors. The ATA system detects available free space available in the scene map in which the towing vehicle and trailer can be maneuvered, where the free space is free of obstacles. The ATA system identifies the path to maneuver towards the desired location. In a similar manner as shown in FIG. 4, the vehicle and trailer in the scene map is shown in the displayed bird's eye view images for viewing by the user. The ATA system initiates the maneuver towards the desired location once the user agrees with the path planned by the ATA system. The ATA system stops maneuvering the vehicle and provides a message to the user whenever an obstacle enters into the planned path.

When the user selects a location on the scene map, the ATA system automatically calculates the distance between the rear end of the trailer and the user's desired location (D_TrP), the path towards the user's desired location, and the desired correlation matrix (DCM[ ]) between the trailer sensors and the vehicle multi-sensor system for every $1/500^{th}$ distance of D_TrP using motion vectors (MVs) of the trailer sensors and the vehicle sensors. When the maneuver is initiated, the ATA system continuously calculates the current correlation matrix (CCM) at a frequency of, for example, 60 samples per second. If the CCM at a given point of time x is not matching with DCM[x] during the maneuver, then the trailer position will be adjusted by controlling the steering of the towing vehicle until the CCM matches with DCM values and the DCM will be updated as per the new position of the trailer. This step continues to happen until the vehicle reaches the desired location. The ATA system considers the direction of maneuver to align the relative data change rate of the trailer sensors with that of the multi-sensor system of the towing vehicle. The system shall not cross the maximum allowed speed at the maximum allowed relative orientation of two sensors (MAX_CM_MV) at any given point of time.

Figure 9:
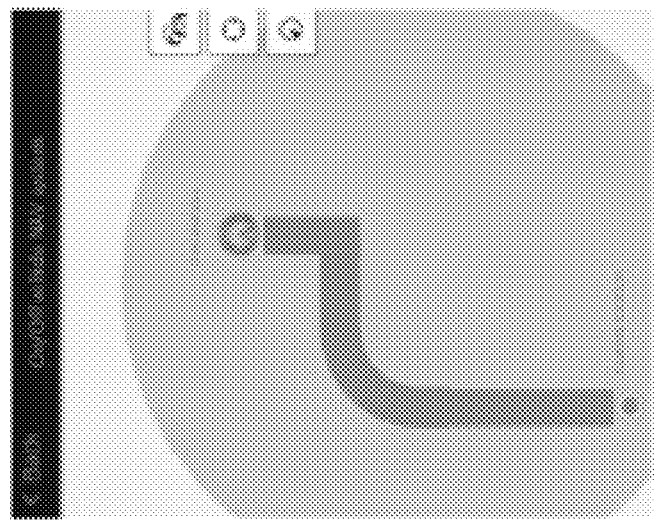
FIG. 9 is an image of a navigation screen showing a determined path from a current location of the vehicle and trailer to a user-selected destination.

The system may use (as inputs) an on/off vehicle navigation system, which directs the trailer to the destination (see FIG. 9). The system may support both on vehicle navigation systems (vehicle-installed systems) and off vehicle navigation systems, such as a portable or hand held navigation device.

Optionally, the system may use a drone camera for an input. For example, the system may use camera images from external sensor data including a drone camera to create the relative scene map for the trailer maneuver. The drone may park or dock at the vehicle or trailer and may detach for remote image data capture above the vehicle and/or trailer and/or surrounding area, whereby the captured image data may be wirelessly transmitted to the vehicle system to assist the system in maneuvering the vehicle and trailer. Optionally, the drone may, when undocked, remain tethered to the vehicle or trailer and may communicate captured image data via a wired connection. The system may utilize aspects of the systems described in U.S. Publication No. US-2018-0141658, which is hereby incorporated herein by reference in its entirety.

Figure 10:
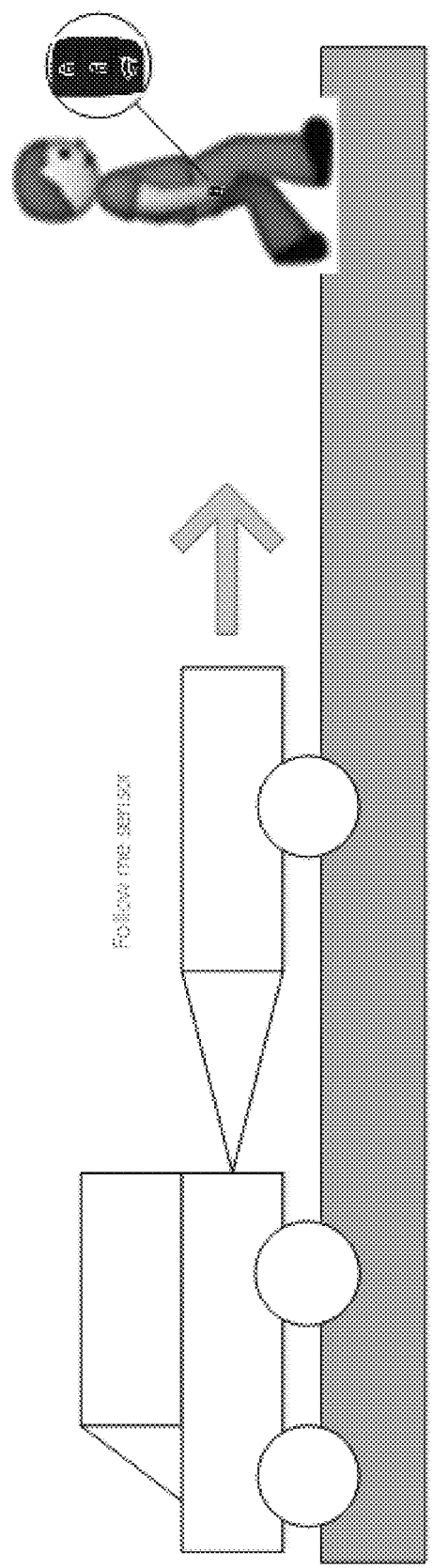
FIG. 10 is a side elevation of the vehicle and trailer showing the system tracking a target in accordance with the present invention.

Optionally, the system may use a target based Input, such as an active target, where a remote device or transmitter may function as an active target. When the user activates the system, it shall track and follow the location of the remote device (see FIG. 10).

Optionally, the system may use a passive target, where the system may track any user defined external target. The system may use the target as a reference for the destination location of the trailer. For example, the system may use a user defined painting on a garage wall as a reference passive target and, upon detecting it, the system maneuvers the vehicle and trailer towards the target.

The system may allow for a user path selection, where a user can define a path for the trailer to maneuver it towards its destination. The system may map the user defined path to the real world coordinate system, and will identify the way points to complete the maneuver. Optionally, the system may allow for an orientation selection, where the user can identify the orientation of the trailer along with defining the position and the path. Optionally, the system may be responsive to a vehicle-to-vehicle/device communication, where the system may use vehicle-to-vehicle (V2V) or vehicle or other device communication as one of the input methods to identify the obstacles and free space.

The system of the present invention is suitable for use on all types of trailers, including trailers attached with a ball/hitch, fifth wheel trailers, pintle trailers and/or goose neck trailers. The system is also suitable for trailers used in the agricultural Industry, used on commercial trucks, tugs, off-road vehicles (ORVs), in the construction industry and in military applications. The system is also suitable for non-trailer applications, and manufacturing vehicles and applications where multiple trailers are attached to a single towing vehicle.

The system thus automatically guides the trailer that is connected to the towing vehicle to a user's selected target location. The system takes the input from the user to select the destination location and convert the input data or coordinates to real world coordinates (XYZ). The system then plans the path of the vehicle (and trailer) towards the destination and maneuvers the vehicle (and trailer) along the determined/planned path.

Thus, the trailer maneuvering assist (TMA) system and/or advanced trailer assist (ATA) system of the present invention operates responsive to a user selecting or setting a location on the display that represents the location to which the trailer is to be maneuvered. The system automatically calculates an obstacle free path from the initial position of the vehicle and trailer to the selected location. The system estimates control parameters at particular intervals required to regulate the trailer for a safer maneuver. The system continuously updates the control parameters during the course of maneuvering and adjusts the path accordingly. The system does not require any sticker or target on the trailer. For a trailer setup process, the user drives the towing vehicle in a forward direction with/without a turn. Whenever a new trailer is connected to the towing vehicle, the user needs to go for a calibration drive to set up the trailer for the vehicle. The system controls the accelerator and brakes of the vehicle while it steers the vehicle to keep the vehicle and trailer moving backward along the determined path and toward the selected location. The user still should monitor the display/mirror and apply the vehicle brakes or control the vehicle steering if required, such as to avoid an obstacle or change the path of rearward travel of the vehicle and trailer.

Optionally, after the user has selected a target or destination location for the vehicle and trailer, the user may select a new destination. The ATA system thus may provide an option to the user to change or adjust the initial/current destination location and/or the orientation of a trailer that is attached to the host vehicle. The ATA system provides an option to the user to change or adjust the initial destination location and/or orientation of the trailer with or without stopping the maneuver of the host vehicle. The ATA system may utilize one or more of user input types, such as a wide variety of input types, for adjusting/changing the destination location.

Figure 11:
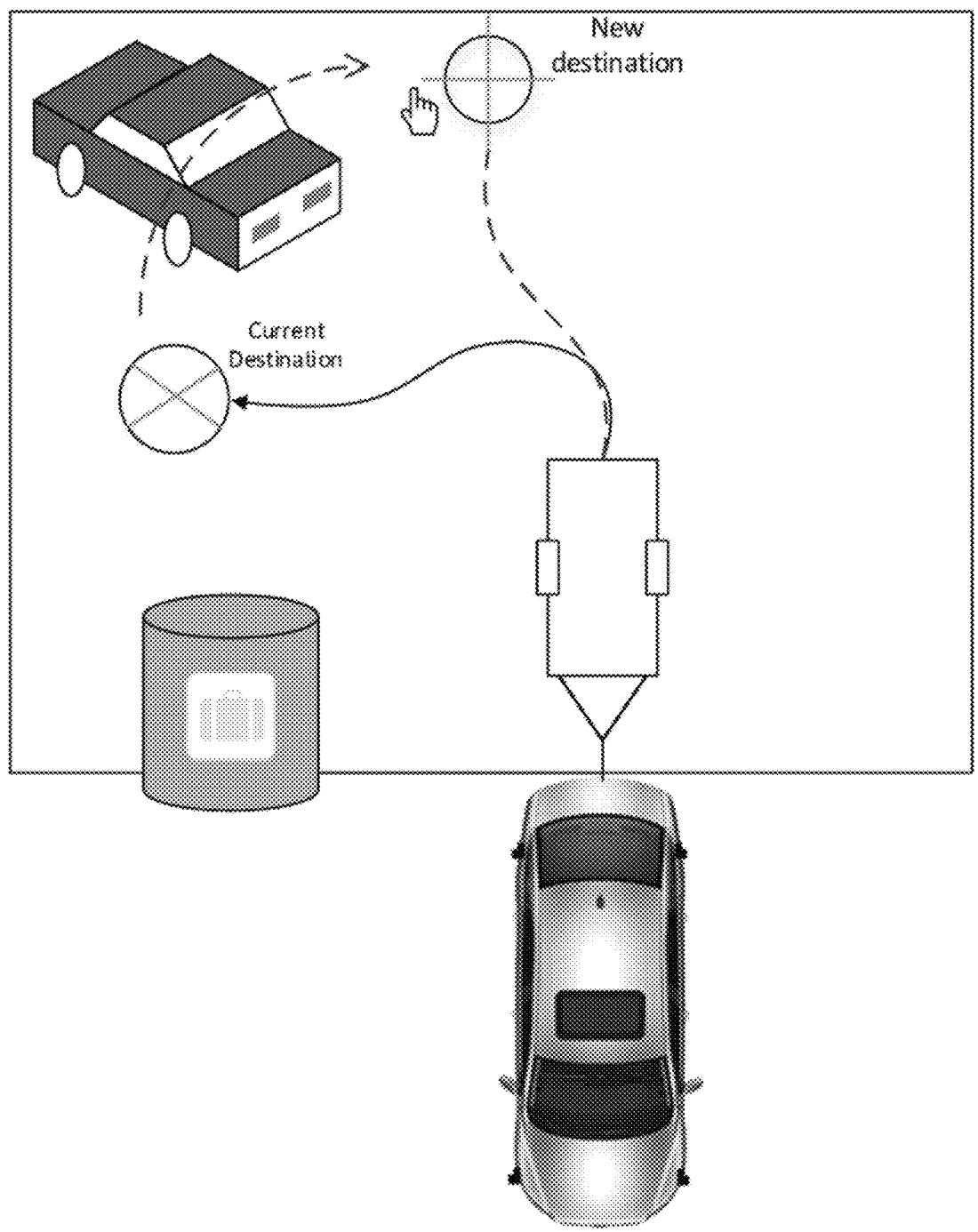
FIG. 11 is a view of a scene map and top view of the vehicle and trailer as displayed by the display screen to allow the user to select current and new targeted locations.

For example, and such as shown in FIG. 11, the system may provide a drag or touch at the display screen to provide selection of a new destination or target location. The driver may select a first target location or destination, and the system may provide for a dynamic (adjusted) destination location. The user is then allowed to change or adjust the destination location, including the orientation of the trailer that is attached to the host vehicle, at any point of time after activating the ATA feature before the trailer reaches the current destination location or upon the trailer arriving at the current destination location.

Once the user adjusts the destination location and orientation of the trailer, the ATA system automatically updates the path planner and calculates the vehicle control triggers required in the new planned path. The system uses the current position of the trailer to update the path planner. Options for the vehicle control triggers to direct the trailer to the new destination location include (a) in case of full autonomous driving of the vehicle and trailer, braking control, acceleration control, gear change and steering wheel control, or (b) in case of semi-autonomous driving, steering wheel control only.

Figure 12:
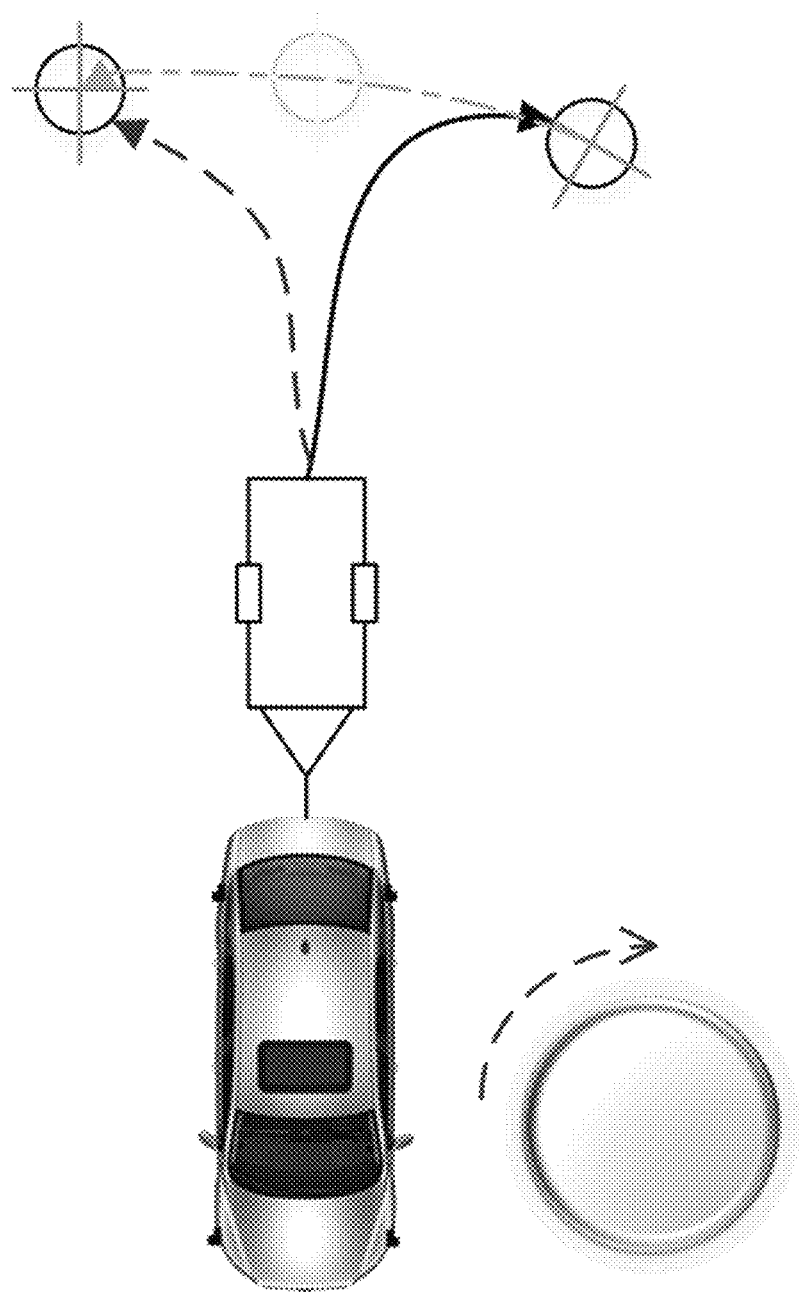
FIG. 12 is a view of another scene map and top view of the vehicle and trailer as displayed by the display screen to allow the user to select current and new targeted locations.

The dynamic destination option provides several advantages to the end user, such as (a) collision avoidance of the trailer with obstacles in the current path by changing or adjusting the path and (b) adjustment of the path when the current path is difficult to maneuver. For example, the following are some of the HMI or control options that can be used by the user to select or choose the fixed or dynamic destinations. The user may drag or move or touch the screen for the new destination location and orientation of trailer on touch screen to change the destination location (see FIG. 11). Optionally, soft or hard buttons may be used to fix/adjust/change the current destination location and orientation of the trailer. Optionally, a knob (FIG. 12) may be used to select the fixed or adjusted destination location and orientation of the trailer. Optionally, the steering wheel may be used to select the fixed or adjusted destination location and orientation of the trailer when the ATA feature is active.

Figure 13:
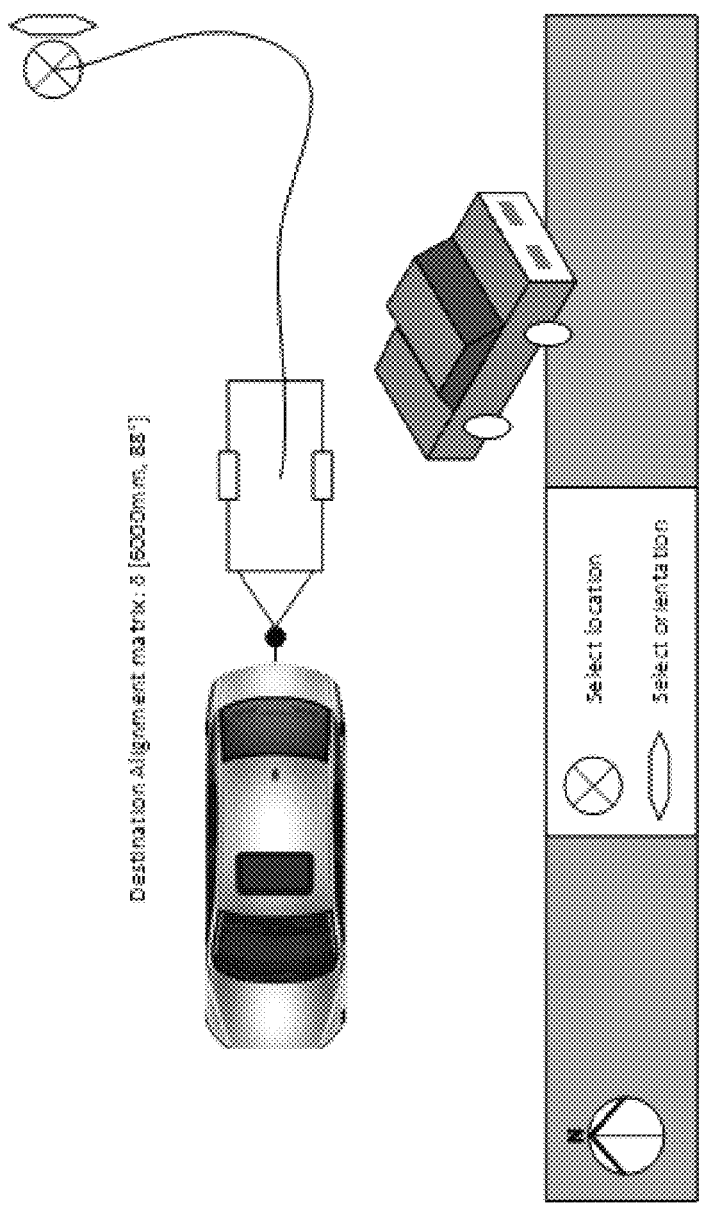
FIG. 13 is a view of another scene map and top view of the vehicle and trailer as displayed by the display screen to allow the user to select a location and orientation.
Figure 14:
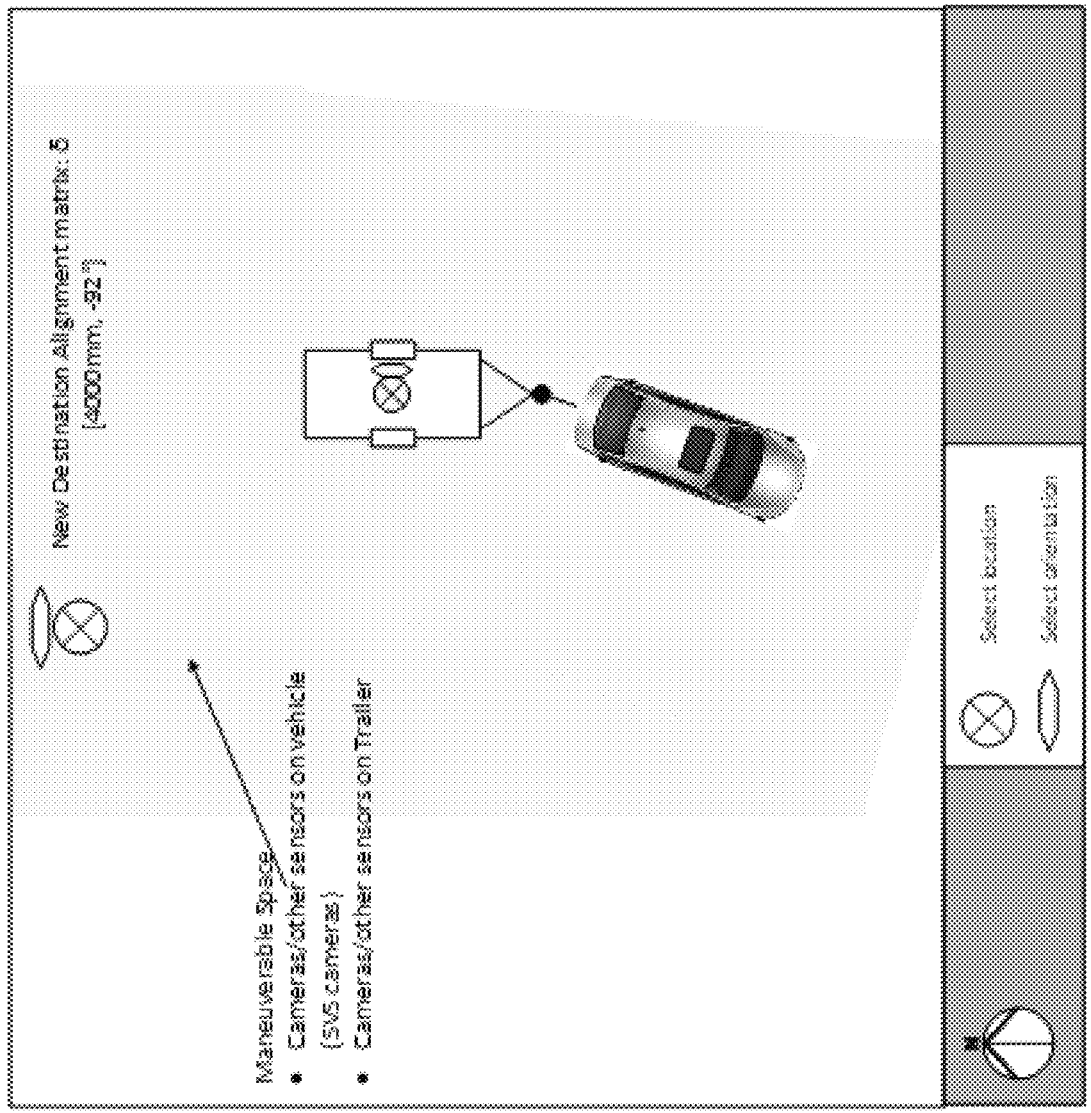
FIG. 14 is a view of another scene map and top view of the vehicle and trailer as displayed by the display screen to allow the user to select a new location and orientation to replace a current location and orientation.

Referring now to FIGS. 13 and 14, the TMA/ATA feature may use cameras and/or sensors on the towing vehicle and/or trailer to create a surround and/or three-dimensional (3D) views of trailer backup maneuvers. For example, the user may be able control or select a location/destination and orientation of a virtual camera to provide a useful view on a display for the backup maneuver. The user may control the virtual camera through a variety of control inputs (e.g., touch screens, knobs, etc.). Optionally, a rearward directed spot light may be used to enhance sensing of the arear rearward of the vehicle and trailer during trailer back-up maneuvers, particularly in low ambient lighting conditions or nighttime driving conditions. The ATA may also use guidelines and/or overlays (2D or 3D) to further assist the user before and during the maneuver. The ATA feature may provide the views in such a manner that the user perceives no blind spots around the towing vehicle and/or the trailer. The system uses the sensors on the towing vehicle and/or on the trailer to create the views (2D and/or 3D) during the trailer back-up maneuvers.

Thus, the user may, while the vehicle is reversing toward a previously selected target location or destination, select a new destination and/or select a new target orientation of the trailer at the destination (initial or newly selected). The system, responsive to the new target location or destination or orientation, adjusts the path of travel of the vehicle and trailer accordingly so that the vehicle is controlled to maneuver the trailer toward the newly selected destination. The system may further adjust the path of travel for further selections of targets or destinations and/or for further selections of targeted or desired orientation(s) of the trailer at the target or destination.

The system may utilize aspects of the trailering or trailer angle detection systems or trailer hitch assist systems described in U.S. Pat. Nos. 9,085,261 and/or 6,690,268, and/or U.S. Publication Nos. US-2018-0215382; US-2017-0254873; US-2017-0217372; US-2017-0050672; US-2015-0217693; US-2014-0160276; US-2014-0085472 and/or US-2015-0002670, and/or U.S. patent application Ser. No. 16/033,416, filed Jul. 12, 2018, now U.S. Pat. No. 10,532,698, Ser. No. 15/928,128, filed Mar. 22, 2018, now U.S. Pat. No. 10,552,976, Ser. No. 15/928,126, filed Mar. 22, 2018, now U.S. Pat. No. 10,885,652, Ser. No. 15/910,100, filed Mar. 2, 2018, now U.S. Pat. No. 10,706,291, which are hereby incorporated herein by reference in their entireties.

The system may utilize aspects of the parking assist systems described in U.S. Pat. No. 8,874,317 and/or U.S. Publication Nos. US-2017-0329346; US-2017-0317748; US-2017-0253237; US-2017-0050672; US-2017-0017847; US-2017-0015312 and/or US-2015-0344028, which are hereby incorporated herein by reference in their entireties.

The cameras or sensors may comprise any suitable cameras or sensors. Optionally, one or more of the cameras may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0045812; US-2018-0015875; US-2017-0356994; US-2017-0315231; US-2017-0276788; US-2017-0254873; US-2017-0222311 and/or US-2010-0245066, and/or U.S. patent application Ser. No. 15/897,268, filed Feb. 15, 2018, now U.S. Pat. No. 10,782,388, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing a forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailering assist system, the vehicular trailering assist system comprising:

at least one vehicle camera disposed at a vehicle equipped with the vehicular trailering assist system, wherein the at least one vehicle camera comprises at least one selected from the group consisting of (i) a rear vehicle camera disposed at a rear portion of the vehicle and viewing at least rearward of the vehicle, (ii) a driver side vehicle camera disposed at a driver side of the vehicle and viewing at least sideward of the vehicle, and (iii) a passenger side vehicle camera disposed at a passenger side of the vehicle and viewing at least sideward of the vehicle;

wherein each camera of the at least one vehicle camera comprises a megapixel imaging array having at least one million photosensor elements arranged in rows and columns;

an electronic control unit (ECU) comprising a processor operable to process image data captured by the at least one vehicle camera;

wherein, with a trailer hitched to the vehicle, image data captured by the at least one vehicle camera is transferred to and is processed at the ECU;

a display screen disposed in the vehicle and viewable by a driver of the vehicle, wherein the display screen is operable to display images derived from image data captured by the at least one vehicle camera;

wherein, when the trailer hitched to the vehicle is not a trailer for which the vehicular trailering assist system has been previously calibrated, the driver is instructed to calibrate the vehicular trailering assist system for the trailer hitched to the vehicle;

wherein, with the trailer hitched to the vehicle, and responsive to obtaining a target location and responsive to one selected from the group consisting of (i) the trailer being a trailer for which the vehicular trailering assist system has been previously calibrated and (ii) completion of calibrating the vehicular trailering assist system for the trailer hitched to the vehicle, the vehicular trailering assist system, at least in part via processing at the ECU of image data captured by the at least one vehicle camera, determines an obstacle-free path of travel for the vehicle and the trailer to follow to maneuver the vehicle and the trailer toward the target location;

wherein the vehicular trailering assist system controls at least steering of the vehicle to maneuver the vehicle and the trailer along the determined obstacle-free path of travel toward the target location; and wherein, while the vehicle and the trailer are maneuvered along the determined obstacle-free path of travel toward the target location, the determined obstacle-free path of travel is displayed on the display screen overlaying displayed video images derived from image data captured by the at least one vehicle camera.

2. The vehicular trailering assist system of claim 1, wherein the vehicular trailering assist system, with the trailer hitched to the vehicle, and via processing at the ECU of image data captured by the at least one vehicle camera, detects at least one object present in the determined obstacle-free path of travel.

3. The vehicular trailering assist system of claim 2, wherein the vehicular trailering assist system, responsive to detecting the at least one object present in the determined obstacle-free path of travel, alerts the driver of the vehicle.

4. The vehicular trailering assist system of claim 2, wherein the vehicular trailering assist system, responsive to detecting the at least one object present in the determined obstacle-free path of travel, adjusts the determined obstacle-free path of travel to avoid the detected at least one object.

5. The vehicular trailering assist system of claim 1, wherein an input indicative of the target location is provided by the driver of the vehicle.

6. The vehicular trailering assist system of claim 1, wherein an input indicative of the target location is provided by the driver of the vehicle moving a cursor at the display screen to the target location present in an image displayed at the display screen.

7. The vehicular trailering assist system of claim 1, wherein an input indicative of the target location is provided by a remote transmitter.

8. The vehicular trailering assist system of claim 1, wherein the vehicular trailering assist system estimates control parameters at particular intervals along the determined obstacle-free path of travel.

9. The vehicular trailering assist system of claim 8, wherein the vehicular trailering assist system updates the estimated control parameters while maneuvering the vehicle and the trailer along the determined obstacle-free path of travel and adjusts the determined obstacle-free path of travel accordingly.

10. The vehicular trailering assist system of claim 1, further comprising at least one trailer camera disposed at a rear portion of the trailer and viewing at least rearward of the trailer, wherein the vehicular trailering assist system determines the obstacle-free path of travel for the vehicle and the trailer to follow in part via processing at the ECU of image data captured by the at least one trailer camera.

11. The vehicular trailering assist system of claim 10, wherein the display screen is operable to display images derived from image data captured by the at least one trailer camera.

12. The vehicular trailering assist system of claim 10, wherein the at least one trailer camera comprises a plurality of trailer cameras disposed at the trailer.

13. The vehicular trailering assist system of claim 1, wherein the at least one vehicle camera comprises the rear vehicle camera, and wherein the rear vehicle camera comprises a rear backup camera of the vehicle.

14. The vehicular trailering assist system of claim 1, wherein the at least one vehicle camera comprises the driver side vehicle camera.

15. The vehicular trailering assist system of claim 14, wherein the driver side vehicle camera is disposed at an exterior rearview mirror assembly at the driver side of the vehicle.

16. The vehicular trailering assist system of claim 1, wherein the at least one vehicle camera comprises the passenger side vehicle camera.

17. The vehicular trailering assist system of claim 16, wherein the passenger side vehicle camera is disposed at an exterior rearview mirror assembly at the passenger side of the vehicle.

18. The vehicular trailering assist system of claim 1, wherein the at least one vehicle camera comprises a plurality of vehicle cameras.

19. The vehicular trailering assist system of claim 18, wherein the plurality of vehicle cameras comprises (i) the rear vehicle camera, (ii) the driver side vehicle camera and (iii) the passenger side vehicle camera.

20. The vehicular trailering assist system of claim 18, wherein the plurality of vehicle cameras comprises a forward viewing camera disposed at a front portion of the vehicle and viewing forward of the vehicle.

21. The vehicular trailering assist system of claim 1, further comprising a remote sensor in wireless communication with the ECU, wherein the remote sensor is remote from the vehicle and the trailer, and wherein sensor data captured by the remote sensor is transferred to the ECU and is processed at the ECU while the vehicle and the trailer are maneuvered along the determined obstacle-free path of travel.

22. The vehicular trailering assist system of claim 21, wherein the remote sensor is disposed at a drone that is operable to maneuver rearward of the trailer.

23. The vehicular trailering assist system of claim 1, wherein, with the trailer hitched to the vehicle, the vehicular trailering assist system determines if the trailer hitched to the vehicle is a trailer for which the vehicular trailering assist system has been previously calibrated.

24. The vehicular trailering assist system of claim 1, wherein instructions provided to the driver of the vehicle for calibrating the vehicular trailering assist system for the trailer hitched to the vehicle comprise driving instructions for a calibration drive of the vehicle and the trailer.

25. The vehicular trailering assist system of claim 24, wherein, after the calibration drive of the vehicle and the trailer is completed, the vehicular trailering assist system provides confirmation to the driver of the vehicle.

26. The vehicular trailering assist system of claim 1, wherein the vehicular trailering assist system controls acceleration of the vehicle while maneuvering the vehicle and the trailer along the determined obstacle-free path of travel toward the target location.

27. The vehicular trailering assist system of claim 1, wherein the vehicular trailering assist system controls braking of the vehicle while maneuvering the vehicle and the trailer along the determined obstacle-free path of travel toward the target location.

28. The vehicular trailering assist system of claim 1, wherein the vehicular trailering assist system controls acceleration and braking of the vehicle while maneuvering the vehicle and the trailer along the determined obstacle-free path of travel toward the target location.

29. A vehicular trailering assist system, the vehicular trailering assist system comprising:
  a plurality of vehicle cameras disposed at a vehicle equipped with the vehicular trailering assist system, wherein the plurality of vehicle cameras comprises (i) a rear vehicle camera disposed at a rear portion of the vehicle and viewing at least rearward of the vehicle, (ii) a driver side vehicle camera disposed at a driver side of the vehicle and viewing at least sideward of the vehicle, and (iii) a passenger side vehicle camera disposed at a passenger side of the vehicle and viewing at least sideward of the vehicle;
  wherein each camera of the plurality of vehicle cameras comprises a megapixel imaging array having at least one million photosensor elements arranged in rows and columns;
  an electronic control unit (ECU) comprising a processor operable to process image data captured by the plurality of vehicle cameras;
  wherein, with a trailer hitched to the vehicle, image data captured by the plurality of vehicle cameras is transferred to and is processed at the ECU;
  a display screen disposed in the vehicle and viewable by a driver of the vehicle, wherein the display screen is operable to display images derived from image data captured by at least one vehicle camera of the plurality of vehicle cameras;
  wherein, when the trailer hitched to the vehicle is not a trailer for which the vehicular trailering assist system has been previously calibrated, the driver is instructed to calibrate the vehicular trailering assist system for the trailer hitched to the vehicle;
  wherein, with the trailer hitched to the vehicle, and responsive to obtaining a target location and responsive to one selected from the group consisting of (i) the trailer being a trailer for which the vehicular trailering assist system has been previously calibrated and (ii) completion of calibrating the vehicular trailering assist system for the trailer hitched to the vehicle, the vehicular trailering assist system, at least in part via processing at the ECU of image data captured by the plurality of vehicle cameras, determines an obstacle-free path of travel for the vehicle and the trailer to follow to maneuver the vehicle and the trailer toward the target location;
  wherein the vehicular trailering assist system controls at least steering of the vehicle to maneuver the vehicle and the trailer along the determined obstacle-free path of travel toward the target location;
  wherein, while the vehicle and the trailer are maneuvered along the determined obstacle-free path of travel toward the target location, the determined obstacle-free path of travel is displayed on the display screen overlaying displayed video images derived from image data captured by at least one vehicle camera of the plurality of vehicle cameras;
  wherein the vehicular trailering assist system, with the trailer hitched to the vehicle, and via processing at the ECU of image data captured by the plurality of vehicle cameras, detects at least one object present in the determined obstacle-free path of travel; and
  wherein the vehicular trailering assist system, responsive to detecting the at least one object present in the determined obstacle-free path of travel, adjusts the determined obstacle-free path of travel to avoid the detected at least one object.

30. The vehicular trailering assist system of claim 29, wherein the vehicular trailering assist system, responsive to detecting the at least one object present in the determined obstacle-free path of travel, alerts the driver of the vehicle.

31. The vehicular trailering assist system of claim 29, wherein an input indicative of the target location is provided by the driver of the vehicle.

32. The vehicular trailering assist system of claim 29, wherein an input indicative of the target location is provided by a remote transmitter.

33. The vehicular trailering assist system of claim 29, further comprising at least one trailer camera disposed at a rear portion of the trailer and viewing at least rearward of the trailer, wherein the vehicular trailering assist system determines the obstacle-free path of travel for the vehicle and the trailer to follow in part via processing at the ECU of image data captured by the at least one trailer camera.

34. The vehicular trailering assist system of claim 33, wherein the display screen is operable to display images derived from image data captured by the at least one trailer camera.

35. The vehicular trailering assist system of claim 33, wherein the at least one trailer camera comprises a plurality of trailer cameras disposed at the trailer.

36. The vehicular trailering assist system of claim 29, wherein the rear vehicle camera comprises a rear backup camera of the vehicle.

37. The vehicular trailering assist system of claim 29, wherein the driver side vehicle camera is disposed at an exterior rearview mirror assembly at the driver side of the vehicle, and wherein the passenger side vehicle camera is disposed at an exterior rearview mirror assembly at the passenger side of the vehicle.

38. The vehicular trailering assist system of claim 29, wherein the plurality of vehicle cameras comprises a forward viewing camera disposed at a front portion of the vehicle and viewing forward of the vehicle.

39. The vehicular trailering assist system of claim 29, wherein, with the trailer hitched to the vehicle, the vehicular trailering assist system determines if the trailer hitched to the vehicle is a trailer for which the vehicular trailering assist system has been previously calibrated.

40. The vehicular trailering assist system of claim 29, wherein instructions provided to the driver of the vehicle for calibrating the vehicular trailering assist system for the trailer hitched to the vehicle comprise driving instructions for a calibration drive of the vehicle and the trailer.

41. The vehicular trailering assist system of claim 40, wherein, after the calibration drive of the vehicle and the trailer is completed, the vehicular trailering assist system provides confirmation to the driver of the vehicle.

42. The vehicular trailering assist system of claim 29, wherein the vehicular trailering assist system controls acceleration of the vehicle while maneuvering the vehicle and the trailer along the determined obstacle-free path of travel toward the target location.

43. The vehicular trailering assist system of claim 29, wherein the vehicular trailering assist system controls braking of the vehicle while maneuvering the vehicle and the trailer along the determined obstacle-free path of travel toward the target location.

44. The vehicular trailering assist system of claim 29, wherein the vehicular trailering assist system controls acceleration and braking of the vehicle while maneuvering the vehicle and the trailer along the determined obstacle-free path of travel toward the target location.

45. A vehicular trailering assist system, the vehicular trailering assist system comprising:

a plurality of vehicle cameras disposed at a vehicle equipped with the vehicular trailering assist system, wherein the plurality of vehicle cameras comprises (i) a rear vehicle camera disposed at a rear portion of the vehicle and viewing at least rearward of the vehicle, (ii) a driver side vehicle camera disposed at a driver side of the vehicle and viewing at least sideward of the vehicle, and (iii) a passenger side vehicle camera disposed at a passenger side of the vehicle and viewing at least sideward of the vehicle;

wherein each camera of the plurality of vehicle cameras comprises a megapixel imaging array having at least one million photosensor elements arranged in rows and columns;

at least one trailer camera disposed at a rear portion of a trailer and viewing at least rearward of the trailer;

an electronic control unit (ECU) comprising a processor operable to process image data captured by the plurality of vehicle cameras;

wherein, with the trailer hitched to the vehicle, image data captured by the plurality of vehicle cameras and the at least one trailer camera is transferred to and is processed at the ECU;

a display screen disposed in the vehicle and viewable by a driver of the vehicle, wherein the display screen is operable to display images derived from image data captured by (i) at least one vehicle camera of the plurality of vehicle cameras and (ii) the at least one trailer camera;

wherein, when the trailer hitched to the vehicle is not a trailer for which the vehicular trailering assist system has been previously calibrated, the driver is instructed to calibrate the vehicular trailering assist system for the trailer hitched to the vehicle;

wherein, with the trailer hitched to the vehicle, and responsive to obtaining a target location and responsive to one selected from the group consisting of (i) the trailer being a trailer for which the vehicular trailering assist system has been previously calibrated and (ii) completion of calibrating the vehicular trailering assist system for the trailer hitched to the vehicle, the vehicular trailering assist system, at least in part via processing at the ECU of image data captured by the plurality of vehicle cameras and the trailer camera, determines an obstacle-free path of travel for the vehicle and the trailer to follow to maneuver the vehicle and the trailer toward the target location;

wherein the vehicular trailering assist system controls at least steering of the vehicle to maneuver the vehicle and the trailer along the determined obstacle-free path of travel toward the target location; and wherein, while the vehicle and the trailer are maneuvered along the determined obstacle-free path of travel toward the target location, the determined obstacle-free path of travel is displayed on the display screen overlaying displayed video images derived from image data captured by the trailer camera and at least one vehicle camera of the plurality of vehicle cameras.

46. The vehicular trailering assist system of claim 45, wherein an input indicative of the target location is provided by the driver of the vehicle.

47. The vehicular trailering assist system of claim 45, wherein an input indicative of the target location is provided by a remote transmitter.

48. The vehicular trailering assist system of claim 45, wherein the at least one trailer camera comprises a plurality of trailer cameras disposed at the trailer.

49. The vehicular trailering assist system of claim 45, wherein the rear vehicle camera comprises a rear backup camera of the vehicle.

50. The vehicular trailering assist system of claim 45, wherein the driver side vehicle camera is disposed at an exterior rearview mirror assembly at the driver side of the vehicle, and wherein the passenger side vehicle camera is disposed at an exterior rearview mirror assembly at the passenger side of the vehicle.

51. The vehicular trailering assist system of claim 45, wherein the plurality of vehicle cameras comprises a forward viewing camera disposed at a front portion of the vehicle and viewing forward of the vehicle.

52. The vehicular trailering assist system of claim 45, wherein, with the trailer hitched to the vehicle, the vehicular trailering assist system determines if the trailer hitched to the vehicle is a trailer for which the vehicular trailering assist system has been previously calibrated.

53. The vehicular trailering assist system of claim 45, wherein instructions provided to the driver of the vehicle for calibrating the vehicular trailering assist system for the trailer hitched to the vehicle comprise driving instructions for a calibration drive of the vehicle and the trailer.

54. The vehicular trailering assist system of claim 53, wherein, after the calibration drive of the vehicle and the trailer is completed, the vehicular trailering assist system provides confirmation to the driver of the vehicle.

55. The vehicular trailering assist system of claim 45, wherein the vehicular trailering assist system controls acceleration of the vehicle while maneuvering the vehicle and the trailer along the determined obstacle-free path of travel toward the target location.

56. The vehicular trailering assist system of claim 45, wherein the vehicular trailering assist system controls braking of the vehicle while maneuvering the vehicle and the trailer along the determined obstacle-free path of travel toward the target location.

57. The vehicular trailering assist system of claim 45, wherein the vehicular trailering assist system controls acceleration and braking of the vehicle while maneuvering the vehicle and the trailer along the determined obstacle-free path of travel toward the target location.

\* \* \* \* \*